US012493513B2

(12) United States Patent
Barnes et al.

(10) Patent No.: US 12,493,513 B2
(45) Date of Patent: Dec. 9, 2025

(54) TIME SERIES ANOMALY DETECTION WITH RARE EVENT FAILURE PREDICTION

(71) Applicant: Dell Products L.P., Round Rock, TX (US)

(72) Inventors: Michael Barnes, Doylestown, PA (US); Sumanta Kashyapi, Worcester, MA (US); Niharika Karia, Tewksbury, MA (US); David C. Sydow, Merrimack, NH (US); Gajanan S Natu, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 75 days.

(21) Appl. No.: 18/466,392

(22) Filed: Sep. 13, 2023

(65) Prior Publication Data

US 2025/0086045 A1 Mar. 13, 2025

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01)

(58) Field of Classification Search
CPC ..... G06F 11/079; G06F 11/021; G06N 20/20; G06N 20/00
See application file for complete search history.

(56) References Cited

U.S. PATENT DOCUMENTS

| 11,397,633 | B2* | 7/2022 | Chakraborty | G06F 11/0769 |
| 2015/0269050 | A1* | 9/2015 | Filimonov | G06Q 10/0639 |
| | | | | 702/183 |
| 2019/0370610 | A1* | 12/2019 | Batoukov | G06F 11/0709 |
| 2020/0174902 | A1* | 6/2020 | Buda | G06F 11/079 |
| 2020/0242240 | A1* | 7/2020 | Ruikar | G06N 20/00 |
| 2021/0004284 | A1* | 1/2021 | Vah | G06N 20/20 |
| 2021/0136098 | A1* | 5/2021 | Stergioudis | G06N 20/10 |
| 2021/0174253 | A1* | 6/2021 | Moore | G06N 7/01 |
| 2021/0209486 | A1* | 7/2021 | Fan | G06N 20/20 |
| 2022/0263842 | A1* | 8/2022 | Chen | H04L 61/5061 |
| 2022/0317674 | A1* | 10/2022 | Sahaf | G16B 30/00 |
| 2022/0327012 | A1* | 10/2022 | Roy | G06N 20/20 |
| 2023/0023646 | A1* | 1/2023 | Xu | G06F 11/004 |
| 2023/0214288 | A1* | 7/2023 | Moctezuma | H04L 67/02 |
| | | | | 714/48 |

(Continued)

OTHER PUBLICATIONS

Dell.com, "PowerStore," https://www.dell.com/en-us/shop/powerstore/sf/power-store, Retrieved from the Internet: Sep. 11, 2023.

(Continued)

*Primary Examiner* — Jonathan D Gibson
(74) *Attorney, Agent, or Firm* — Amin, Turocy & Watson, LLP

(57) ABSTRACT

A method for time series anomaly detection with rare event failure prediction includes determining, by a device including a processor and using a first machine learning model, a location of a data anomaly within sequential data. The method also includes determining, by the device and using a second machine learning model that is not the first machine learning model, whether a probability of a future failure event is at least a threshold probability based on the data anomaly and the sequential data.

20 Claims, 12 Drawing Sheets

(56) References Cited

U.S. PATENT DOCUMENTS

| | | | |
|---|---|---|---|
| 2023/0275915 A1* | 8/2023 | Kaul | H04L 63/1425 |
| | | | 726/23 |
| 2024/0036963 A1* | 2/2024 | Azeez | G06N 20/00 |
| 2024/0086736 A1* | 3/2024 | Kwartler | G06F 11/0751 |
| 2024/0134736 A1* | 4/2024 | Chen | G06N 3/0464 |
| 2024/0303529 A1* | 9/2024 | Rane | G06N 20/00 |
| 2024/0362105 A1* | 10/2024 | Barnes | G06F 11/079 |
| 2025/0068962 A1* | 2/2025 | Avneon | G06N 20/00 |

OTHER PUBLICATIONS

Dell.com, "PowerScale All-Flash NAS Platforms," https://www.dell.com/en-us/dt/storage/powerscale/powerscale-all-flash-nas.htm, Retrieved from the Internet: Sep. 11, 2023.

* cited by examiner

TIME SERIES ANOMALY DETECTION WITH RARE EVENT FAILURE PREDICTION

BACKGROUND

Large scale enterprise computing systems often have complex and hard to determine failure conditions. Triage and root cause analysis (RCA) of these failure conditions typically requires a significant investment of time and resources, which can in turn exacerbate disruptions to service resulting from a failure. Additionally, the large variety of factors that can lead to a failure, such as hardware problems, software errors, external client environmental issues, or a combination of these and/or other factors, can introduce additional complexity into the RCA process.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include an anomaly detection component that locates, using a first machine learning model, anomalous data points within a data sequence. The executable components can also include an event prediction component that determines, using a second machine learning model that is not the first machine learning model, whether a likelihood of a future service disruption event is at least a threshold likelihood based on the anomalous data points located by the anomaly detection component and the data sequence.

In another implementation, a method is described herein. The method can include determining, by a device including a processor and using a first machine learning model, a location of a data anomaly within sequential data. The method can further include determining, by the device and using a second machine learning model that is not the first machine learning model, whether a probability of a future failure event is at least a threshold probability based on the data anomaly and the sequential data.

In an additional implementation, a non-transitory machine-readable medium is described herein that can include instructions that, when executed by a processor, facilitate performance of operations. The operations can include determining, using a first machine learning model, a location of an anomalous sample within a data sequence; and determining, using a second machine learning model that is not the first machine learning model, that a probability of a future disruptive event is at least a threshold probability based on the location of the anomalous sample and the data sequence.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
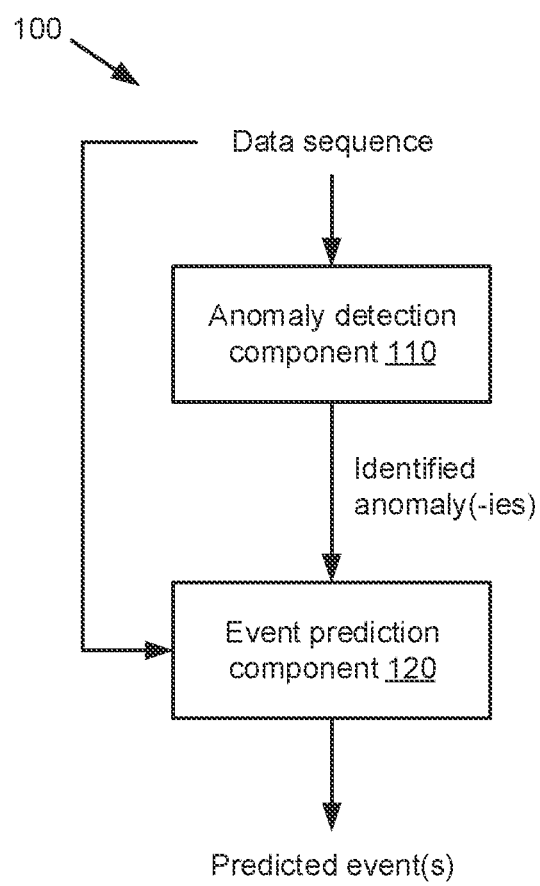
FIGS. 1-2 are block diagrams of respective systems that facilitate time series anomaly detection with rare event failure prediction in accordance with various implementations described herein.

With reference now to the drawings, FIG. 1 illustrates a block diagram of a system 100 that facilitates time series anomaly detection with rare event failure prediction in accordance with various implementations described herein. System 100 as shown in FIG. 1 includes an anomaly detection component 110 and an event prediction component 120, each of which can operate as described in further detail below. In an implementation, the components 110, 120 of system 100 can be implemented in hardware, software, or a combination of hardware and software. By way of example, the components 110, 120 can be implemented as computer-executable components, e.g., components stored on a memory and executed by a processor. Examples of computer architectures including a processor and a memory that can be used to implement the components 110, 120, as well as other components as will be described herein, is shown and described in further detail below with respect to FIGS. 12-13.

Additionally, it is noted that the functionality of the respective components shown and described herein can be implemented via a single computing device and/or a combination of devices. For instance, in various implementations, the anomaly detection component 110 shown in FIG. 1 could be implemented via a first device, and the event prediction component 120 could be implemented via the first device or a second device. Also, or alternatively, the functionality of a single component could be divided among multiple devices in some implementations.

As noted above, large scale enterprise systems, and/or other large scale computing systems, often have complex failure conditions that are difficult to determine. While there are many failure cases in these systems that can be detected using machine learning (ML) based solutions, there are two issues that prevent conventional ML-based techniques from detecting every possible failure case that can arise in a system.

First, it is computationally infeasible, especially on embedded enterprise systems, to run many ML models at the same time for every new data point observed in the system. Instead, it would be desirable to run the desired ML models on demand and only when there is sufficient reason to suspect an impending failure. Second, the inherent accuracy of many ML models used to detect rare failures is low due to the lack of labeled failure data inherent in rare events. In contrast, high model accuracy is desirable, e.g., in order to prevent expenditures of time and resources associated with false positives. If the ML model used to predict failures can be reinforced with additional data, this additional data will increase the overall accuracy and reduce false positives.

In view of at least the above, described herein are techniques that can leverage interactions between multiple ML models to identify and predict rare failure events, e.g., in an enterprise system and/or other computing system, in such a way that root cause analysis (RCA) can be performed. For instance, some implementations described herein can solve both of the above-described problems by layering an anomaly detection engine in front of a supervised classification suite. The anomaly detection engine can be used to provide references to times at which the supervised classification suite should be run, as well as to reinforce the data results provided by the supervised classification suite.

The above and/or other implementations as described herein can provide various advantages that can improve the performance of a computing system. For instance, a dual-layered approach to event classification as described herein can significantly reduce the amount of data on which a supervised classifier operates, which can result in improvements to the efficiency of an underlying computing system in terms of, e.g., power consumption, processor and/or memory cycles, network bandwidth usage, time and/or monetary costs, etc. Additionally, event classification techniques as described herein can improve the accuracy of predicting failure events, which can reduce system downtime, the need for further diagnostic testing that could incur additional costs in terms of computing resources, time, etc., and/or other expenditures associated with false positive or false negative predictions. Other advantages of the implementations described herein are also possible.

It is noted that while some implementations are described herein with reference to specific types of ML models, other types of models could be utilized to attain similar results, as will be described in further detail below. It is also noted that, due to the nature and quantity of time series data and/or other data that can be processed as described herein, as well as the manner in which such data is processed, implementations described herein can facilitate operations that could not be performed in the human mind, or by a general-purpose computer utilizing conventional computing techniques, in a useful or reasonable timeframe. It is additionally noted that while various implementations are described herein with reference to predicting failures of a computing device based on time series data associated with metrics or other properties of the computing device, these implementations are provided merely by way of non-limiting example and that other implementations that operate to detect any suitable failure or disruptive events and/or other rare events based on an input data sequence are also possible.

In the above context, a "computing device," or simply a "device," refers to any suitable device that is operable to perform one or more computing functions. A computing device as described herein can be of various device types, such as computing system devices, data storage devices, or the like. As used herein, a "computing system device" refers to a device that can perform some or all of the functions of a computer or computing system. A computing system device could itself be a computer (e.g., a desktop or laptop computer, etc.), and/or part of a computing system such as a server component, etc. As further used herein, a "data storage device" refers to a device having the primary purpose of storing data, e.g., for use in a computing system by one or more computing system devices as described above. The term "data storage device" is intended to refer both to individual storage drives, modules, etc., as well as a storage node and/or similar device that incorporates one or more individual storage drives, modules, etc. In implementations in which a storage node or other similar device is used as a data storage device, the data storage device could also include its own computing system, e.g., for managing the operation of associated storage drives, modules, etc., and/or data stored by such components.

With reference now to the components of system 100, the anomaly detection component 110 can locate, using a first ML model, anomalous data points within a data sequence. In an implementation, the data sequence can be and/or otherwise include time series data, such as telemetry data that is collected in real time or near real time and provided to system 100 as a multivariate data stream. As used herein, the term "system metrics," or simply "metrics," refers to data indicative of any parameters that relate to the operation of an underlying computing system or data storage device, e.g., with respect to system performance, capacity, or the like. Examples of these parameters can include, but are not limited to, processor utilization and/or data unavailability/data loss (DU/DL); parameters for read and/or write operations such as input/output (I/O) size, storage capacity used, storage capacity free, bits per second (BPS), or latency; and/or any other parameters that are determined to be potentially indicative of a service disruption event. It is noted, however, that the anomaly detection component 110 could operate to detect anomalies in any suitable data sequence for which rare events are desirably predicted.

While not shown in FIG. 1, an input data sequence can be pre-processed prior to being provided as input to system 100, e.g., via normalization and/or other techniques, to ensure that the data has a consistent time scale and input format. Various example implementations of the anomaly detection component 110, and operations that can be performed by those implementations, are described in further detail below with respect to FIGS. 2-4.

The event prediction component 120 of system 100 can predict, using a second ML model that is not the first ML model described above that is utilized by the anomaly detection component 110, whether a failure event is likely to occur based on the data sequence that is also provided to the anomaly detection component 110 as described above as well as the anomalous data points identified by the anomaly detection component 110. In an implementation, an event can be determined to be "likely" to occur if the probability or likelihood of the event occurring, e.g., within a defined amount of time running from the time of the determination, is at least a defined threshold probability or likelihood. Various example implementations of the event prediction component 120, and operations that can be performed by those implementations, are described in further detail below with respect to FIGS. 5-6.

As used herein, the terms "failure event," "service disruption event," "disruptive event," or the like can refer to any event that results in at least a partial loss of functionality of a computing device (e.g., a computing system or a data storage device) with respect to accessing and/or using data stored by the computing device. A failure event can include, for example, a hardware failure such as the failure of a hard drive, processor, memory module, etc.; a software failure associated with an operating system and/or any software applications; a loss of network connectivity, e.g., due to component or configuration errors; and/or any other such disruptive occurrence. Thus, for example, in an implementation in which a data sequence processed by system 100 includes time series data relating to metrics of a computing device, a detected failure event can correspond to a failure of that computing device and/or one or more components of the system (e.g., hardware components, software components, etc.).

In one implementation, the anomaly detection component 110 can incorporate a multivariate time series anomaly detection model to detect anomalous system behavior data. If an anomaly is detected, the event prediction component 120 can then run a multivariate time series classifier to predict rare event failures. Both models can be run on a common set of multivariate time series features, including time windows, to enable the models to be run in tandem. In doing so, system 100 can provide a method for identifying metrics to be used in the process of RCA and/or other procedures. Additionally, system 100 can augment the often insufficient accuracy of a supervised classifier running alone by reinforcing the results of such a classifier with detected anomalies. System 100 can also reduce computational complexity by running ML classification algorithms on demand based on detected anomalies.

As described above, the anomaly detection component 110 can identify data anomalies within sequential data provided to the anomaly detection component 110. As used herein, the term "anomaly" or "anomalous data" refers to a pattern in data that does not conform to an expected behavior, e.g., in the absence of any failure or service disruption events. In some implementations, whether a given data point represents an anomaly can be determined based on statistical properties of the data stream. For instance, an average and/or standard deviation can be tracked for a moving time window, and data points that are determined to be outside of a range defined by the moving average plus or minus a given number of standard deviations can be designated as anomalous. Other techniques could also be used.

By detecting anomalies separately from the process of classifying those anomalies, a prediction of a rare event failure made by system 100 can be significantly less likely to be a false positive, e.g., compared to conventional techniques. Additionally, in the event that a classifier prediction is a false negative, independent anomaly detection can still provide information regarding the corresponding anomaly for further analysis and review.

The anomaly detection component 110 can incorporate one or more unsupervised ML models to detect anomalies in multivariate time series data and/or other sequential data. By way of example, training data for the unsupervised model(s) used by the anomaly detection component 110 can include unlabeled metric data (e.g., performance metric data, capacity metric data, etc.) associated with normal system operation, e.g., in the absence of errors or failures. In some implementations, the input data to the anomaly detection component 110 can also be used as training data under the assumption that failure events will be sufficiently rare as to not significantly affect training outcomes.

Figure 2:
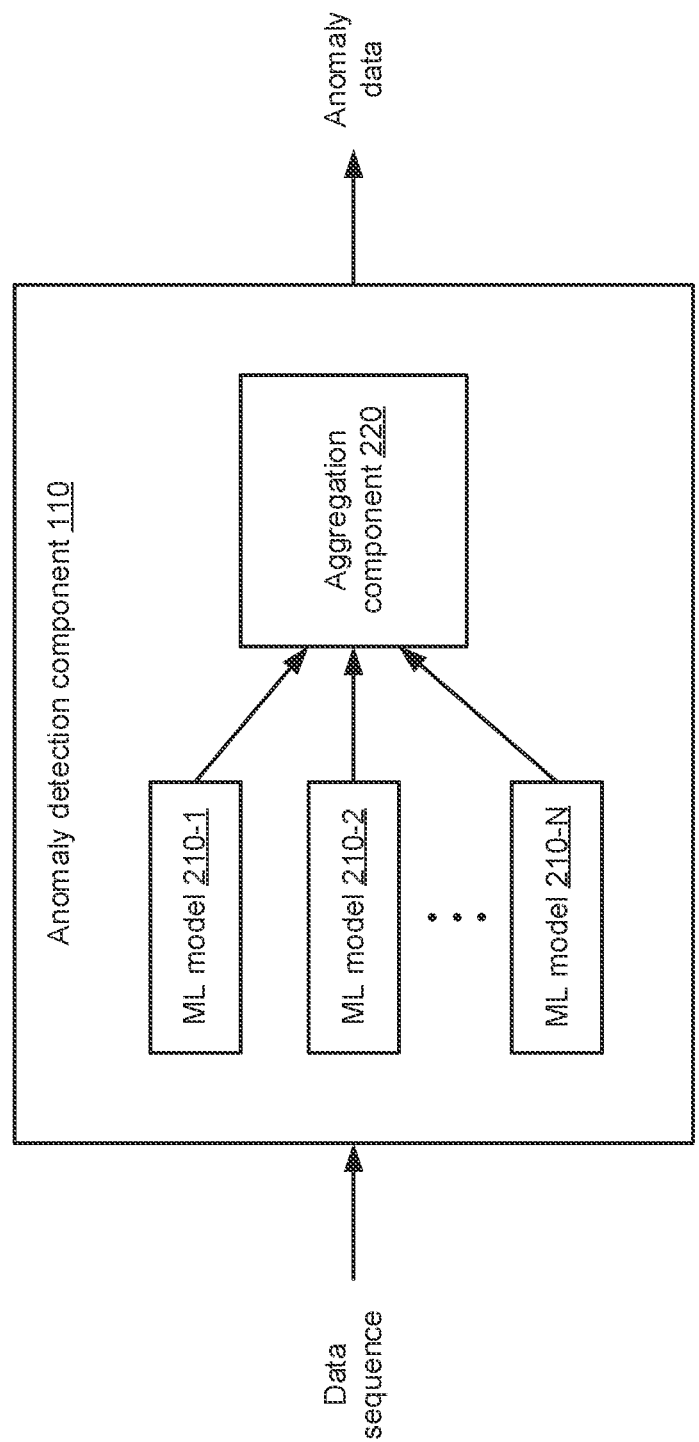

In an example implementation of the anomaly detection component 110 shown by FIG. 2, the anomaly detection component 110 can utilize a group of ML models, here a group of N ML models 210-1 through 210-N, each of which can analyze an incoming data sequence and produce intermediate outputs. These intermediate outputs can then be provided to an aggregation component 220, which can aggregate the intermediate outputs from the individual ML models 210-1 through 210-N based on a defined aggregation or combination criterion. Examples of aggregation/combination criteria that can be utilized by the aggregation component 220 are described in further detail below with respect to FIGS. 3-4. As described above, multivariate time series data and/or other sequential data provided as input to the anomaly detection component 110 and its respective ML models 210 as shown in FIG. 2 can be pre-processed to utilize a single consistent time scale and input format between variables for ease of operation.

The ML models 210 shown in FIG. 2 can be of the same and/or different model types. Examples of ML models that can be utilized include, but are not limited to, an isolation forest, a one-class support vector machine (SVM), principal component analysis (PCA), t-distributed stochastic neighbor embedding (t-SNE or TSNE), vector autoregression, unsupervised anomaly detection (USAD), a variational autoencoder long-short term memory (LSTM) model, and/or any other suitable model type(s).

In an implementation in which multiple model types are used, each of the ML models 210 associated with the anomaly detection component 110 can be utilized to detect respective types of anomalies, which could be the same types and/or different types to those detected by others of the ML models 210. Accordingly, the ML models 210 can be trained to solve the same problem (e.g., anomaly detection) and combined via the aggregation component 220 to obtain a composite response indicative of anomalies detected in an input data sequence.

Figure 3:
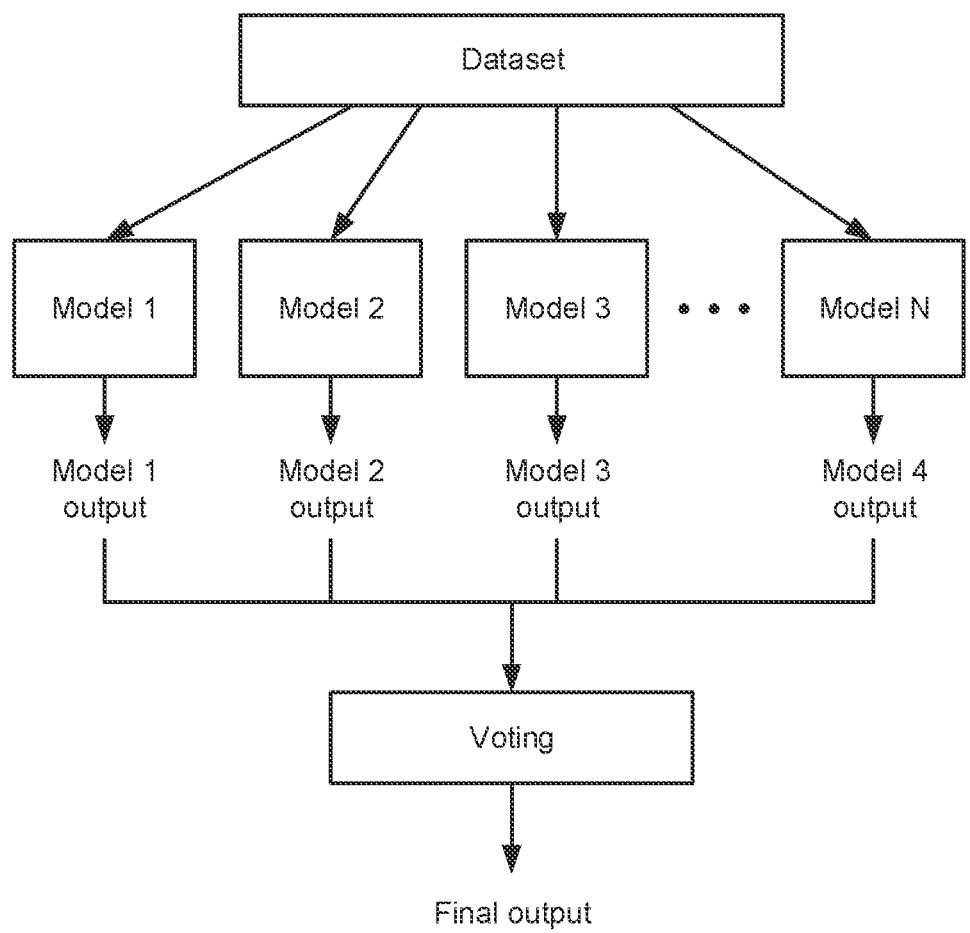
FIGS. 3-4 are diagrams depicting anomaly detection operations that can be performed in accordance with various implementations described herein.

An example of model output aggregation that can be performed by the aggregation component 230 is shown by FIG. 3. Here, an input dataset is provided to a group of N unique unsupervised models that provide independent model outputs. A voting scheme can then be applied to the model outputs to obtain a final output of the anomaly detection component 110. As each of the models shown in FIG. 3 can be tailored to detecting different types of anomalies, the outputs of the respective models can differ for a given data sample. Accordingly, voting can be used to combine these different results to improve overall accuracy.

In an implementation, the voting scheme can utilize majority voting, in which the model outputs from the individual models are assessed and the final output is assigned based on the output that is produced by the majority of the individual models. For instance, if 5 out of 7 models determine that no anomaly is present and the other 2 models determine one is present, the final output will be a prediction that no anomaly is present. Similarly, minority voting can be used, in which the final output is assigned based on the output that is produced by the minority of the individual models, provided at least one model produced the minority output.

Figure 4:
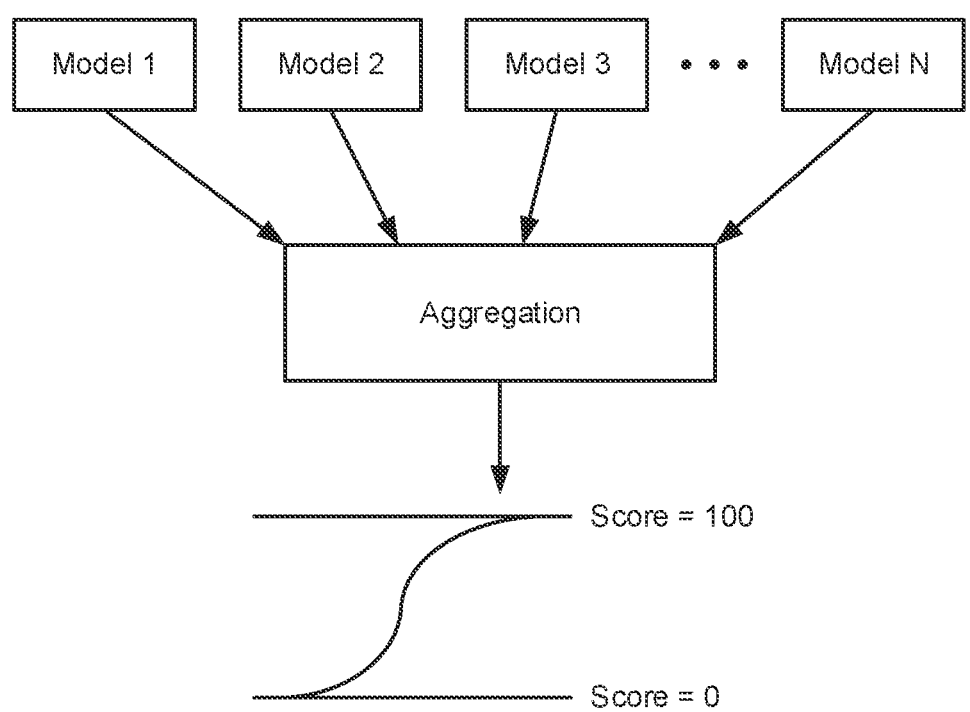

A third voting scheme that utilizes a weighted average voting technique is shown by FIG. 4. In this technique, the output from each individual model can be assigned an importance score based on the accuracy of the model and/or its F1 score. Model outputs can then be weighted by the corresponding importance scores of the models to evaluate a final output. In the example shown by FIG. 4, one or more functions are used to constrain this final output to a given range, e.g., between 0 and 100 as shown by FIG. 4. Based on this transformation, the anomaly detection component 110 can designate a given data sample as anomalous if its transformed score is greater than a given value (e.g., 50, etc.).

Returning now to FIG. 1, the event prediction component 120 can, as described above, predict failure or service disruption events based on sequential data (e.g., time series data associated with a computing system or data storage device and/or other suitable data) and information relating to anomalies in that data, e.g., as identified by an anomaly detection component 110 as described above. To this end, the event prediction component 120 can incorporate one or more supervised ML models to analyze the provided data and respective anomalies detected in that data. In an implementation in which the input data sequence corresponds to metrics of a computing device, training data for the supervised model(s) used by the event prediction component 120 can include labeled training data corresponding to respective samples of device metrics (e.g., performance metrics, capacity metrics, etc.) preceding previous service disruption events, examples of which are described in further detail below with respect to FIG. 6.

Figure 5:
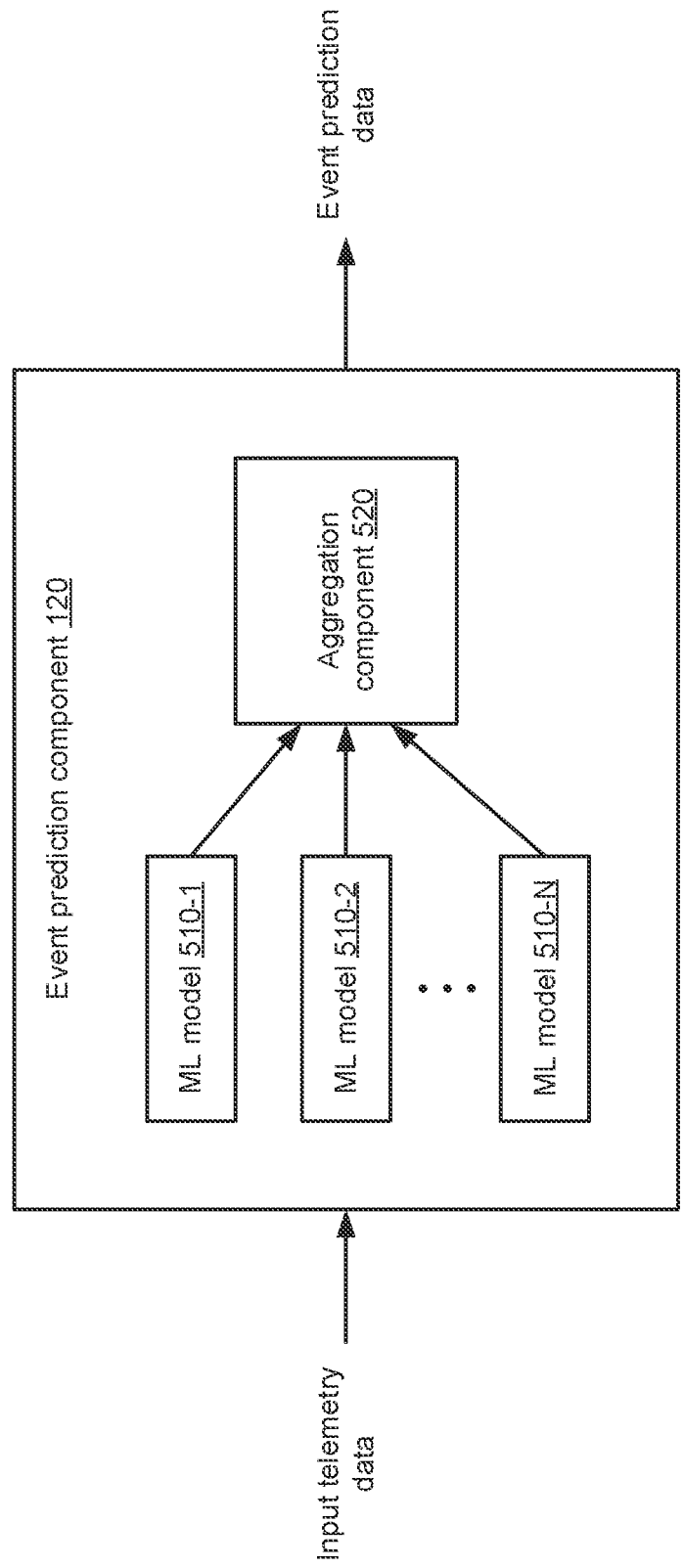
FIG. 5 is a block diagram of an additional system that facilitates time series anomaly detection with rare event failure prediction in accordance with various implementations described herein.

In an example implementation of the event prediction component 120 shown by FIG. 5, the event prediction component 120 can utilize a group (suite) of ML models, here a group of N ML models 510-1 through 510-N, each of which can analyze input telemetry data, e.g., incoming time series data and/or other sequential data, information regarding anomalies detected in the incoming data, etc., to produce intermediate outputs. These intermediate outputs can then be provided to an aggregation component 520, which can select one of the ML models 510 and/or model outputs based on a defined selection criterion.

The ML models 510 shown in FIG. 5 can be of the same and/or different model types. For instance, some of the ML models 510 can compress incoming data into feature vectors and perform classification on the resultant vectors using techniques such as multilayer perception (MLP) or the like. Alternatively, respective ones of the ML models 510 can utilize sequence-based classifiers such as those based on bidirectional LSTM (biLSTM) or the like. As still other examples, one or more of the ML models 510 could utilize techniques based on a canonical interval forest. Other techniques could also be used.

In some implementations, the aggregation component 520 can implement a champion-challenger training strategy, and/or other suitable techniques, to select a model from the N models 510 within the suite shown by FIG. 5 based on the performance of the respective models (e.g., by selecting the best performing model of the N models, etc.). Other techniques could also be used, such as techniques based on a voting scheme in a similar manner to the voting schemes described above with reference to the anomaly detection component 110.

As shown in FIG. 5, the input to the event prediction component 120 can include telemetry data that includes anomalies detected by the anomaly detection component 110 (e.g., as described above) and the same multivariate data sequence used by the anomaly detection component 110. Once an anomaly has been detected by the anomaly detection component 110, the event prediction component 120 can predict whether a rare event failure will occur, e.g., using one or more ML models 510. Because the event prediction component 120 shown in FIG. 5 uses supervised classification, it can be assumed that the ML models 510 have already been trained with the same features that are used as input to the event prediction component 120. However, as will be described below with respect to FIG. 6, the individual time and/or data points within the dataset used for training the ML models 510 can be different than those used for inference.

In the event that the event prediction component 120 predicts an imminent failure event, it can record information associated with the event which can include, but may not be limited to, the time window in which the anomaly was detected and the parameters and/or features that are determined to be responsible for the failure. This information can then be provided to other components for further analysis, e.g., as will be described below with respect to FIG. 8.

Figure 6:
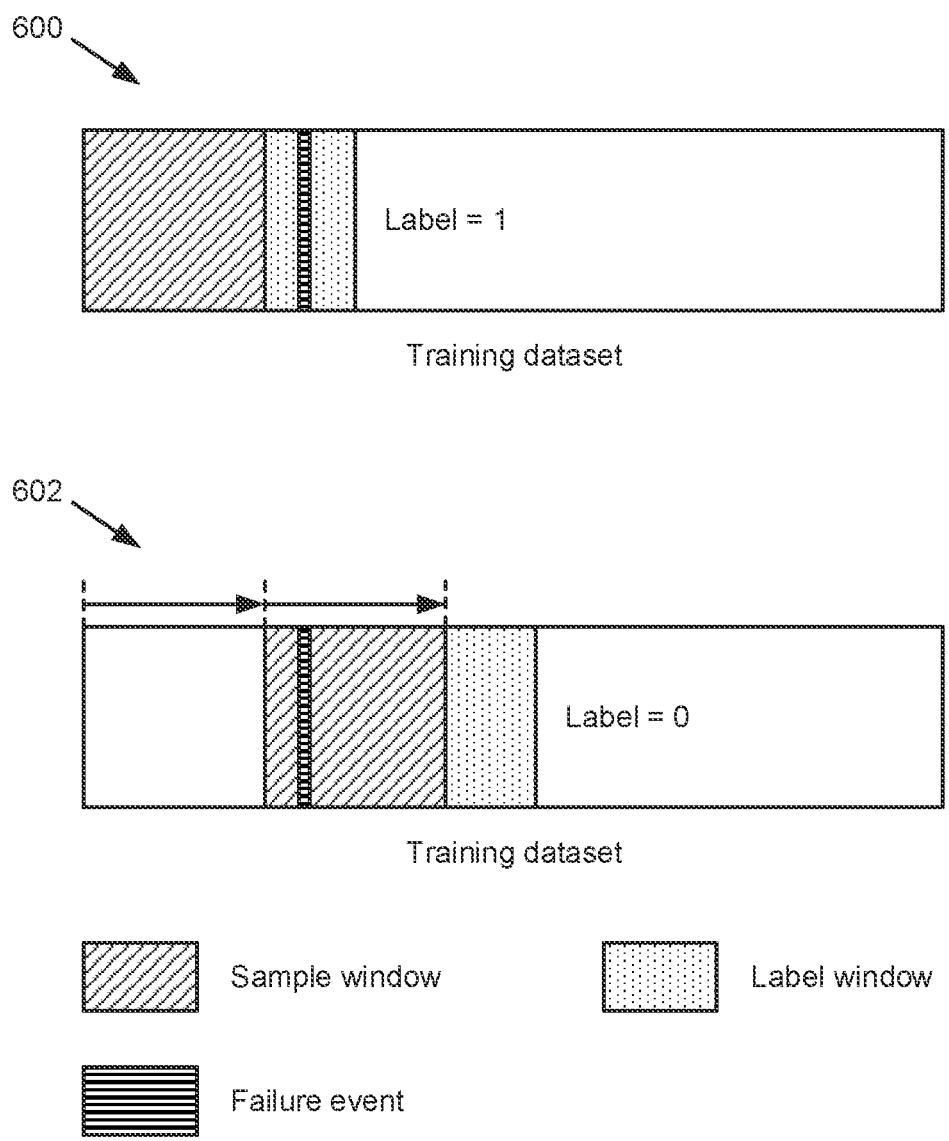
FIG. 6 is a diagram depicting event classification operations that can be performed in accordance with various implementations described herein.

An example technique that can be utilized to generate training data for the ML models 510 is illustrated by FIG. 6. More particularly, FIG. 6 illustrates two processing stages 600, 602 that can be performed on a training dataset that includes sections of multivariate time series data for times corresponding to documented failure or service disruption events, either on the system monitored by the event prediction component 120 and/or similar systems. To facilitate proper training of the ML models 510, the training dataset can include the same metrics and/or variables that will be analyzed by the ML models 510. As further shown by FIG. 6, the training dataset can include timestamps or other indications of the location of the failure events during the time series. While only one failure event is shown in FIG. 6 for simplicity, it is noted that the training dataset can include multiple such events.

As shown by FIG. 6, labeling of the training dataset can be performed using a moving window that incorporates separate sample and label windows, where the sample window precedes the label window. In this manner, respective samples of the training dataset can be labeled based on whether or not a documented failure occurred just after the sample, which can enable prediction of future failures based on similar pre-failure characteristics.

As shown at stage 600, a sample window occupies an initial position within the training dataset, and a label window immediately follows the sample window. It is noted that the relative sizes of the sample window, the label window, and the training dataset are merely for purposes of illustration and are not drawn to any particular scale. Here, because the failure event falls within the label window, the sample at stage 600 is designated a positive sample, e.g., by assigning an affirmative label (e.g., label=1) to the sample.

As further shown at stage 602, after labeling for a given sample is complete, the sample and label windows can be moved forward within the training dataset, and labeling can continue for a subsequent sample. While stage 602 shows an implementation in which the sample and label windows move an amount equal to the size of the sample window, it is noted that the movement could instead be more, or less, than this amount in some implementations. In the example shown at stage 602, the documented failure event falls within the sample window. However, because the associated label window does not include any documented failures, the sample at stage 602 can be designated a negative sample, e.g., by assigning a negative label (e.g., label=0) to the sample. The reason for applying a negative sample at stage 602 is that the goal of the training data is to aid in predicting future failure events, rather than identifying failure events that have already occurred. Subsequent to the labeling shown at stage 602, the movement and sampling operations shown at stage 602 can be repeated, e.g., until the end of the training data is reached.

Figure 7:
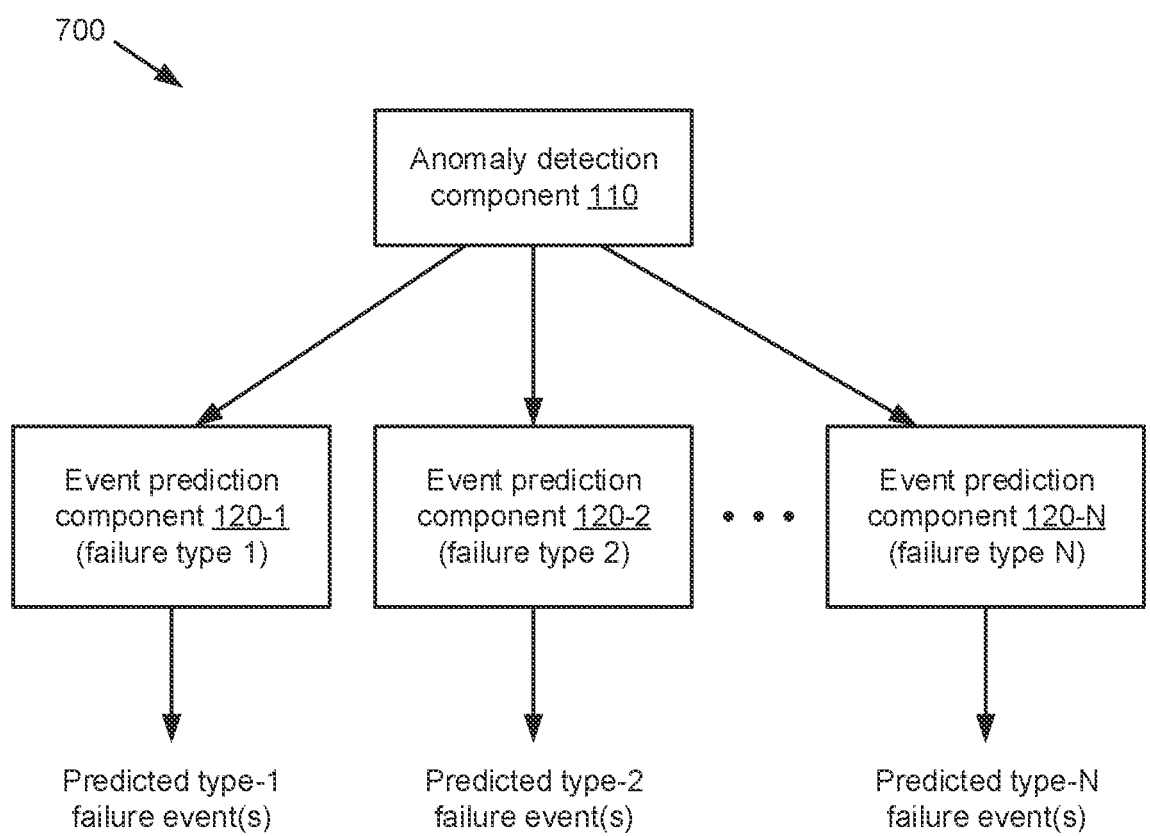
FIGS. 7-8 are block diagrams of further systems that facilitate time series anomaly detection with rare event failure prediction in accordance with various implementations described herein.

With reference now to FIG. 7, a block diagram of another system 700 that facilitates time series anomaly detection with rare event failure prediction is illustrated. Repetitive description of like parts described above with regard to other implementations is omitted for brevity. System 700 as shown in FIG. 7 includes an anomaly detection component 110 that can identify anomalies in time series data and/or other sequential data, e.g., as described above with respect to FIG. 1. In contrast to the single event prediction component 120 shown in FIG. 1, system 700 can include multiple event prediction components 120, here N event prediction components 120-1 through 120-N, each of which can be utilized to predict different types of failures and/or other service disruption events.

In an implementation, each of the event prediction components 120 shown in system 700 can include different ML models, e.g., ML models 510 as described above with respect to FIG. 5, which can operate on the same and/or different sets of parameters to identify events of their associated type. By way of example, event prediction component 120-1 could utilize first ML models to identify a failure of a first device within a computing device based on a first subset of system performance parameters that are specific to that device, and event prediction component 120-2 could utilize second ML models to identify a failure of a second, different computing device based on a second subset of system performance parameters that are specific to the second device. As another example, different event prediction components 120 could employ ML models to determine different types of failures of the same device based on respective subsets of performance parameters that are both specific to that device and relevant to the specific type(s) of failures being predicted by the different models.

In some implementations, the different event prediction components 120 shown in FIG. 7 could utilize different threshold likelihoods in determining whether their associated failure events are considered to be imminent. Thus, for example, event prediction component 120-1 could predict a failure event in response to a probability of that event being determined to be at least a first threshold probability, and event prediction component 120-2 could predict a different failure event in response to a probability of the event being determined to be at least a second threshold probability.

In addition to the event prediction components 120 tailored to specific failure types as shown by FIG. 7, system 700 could also incorporate a generalized event prediction component 120 that performs general failure prediction, e.g., as described above with respect to FIG. 1. Thus, for example, event prediction as shown by system 700 could be performed by specialized models trained on a comparatively small number of parameters to enable fast prediction of a specific type of failure as well as by general models trained on a comparatively large number of parameters to provide slower but more comprehensive event prediction.

Figure 8:
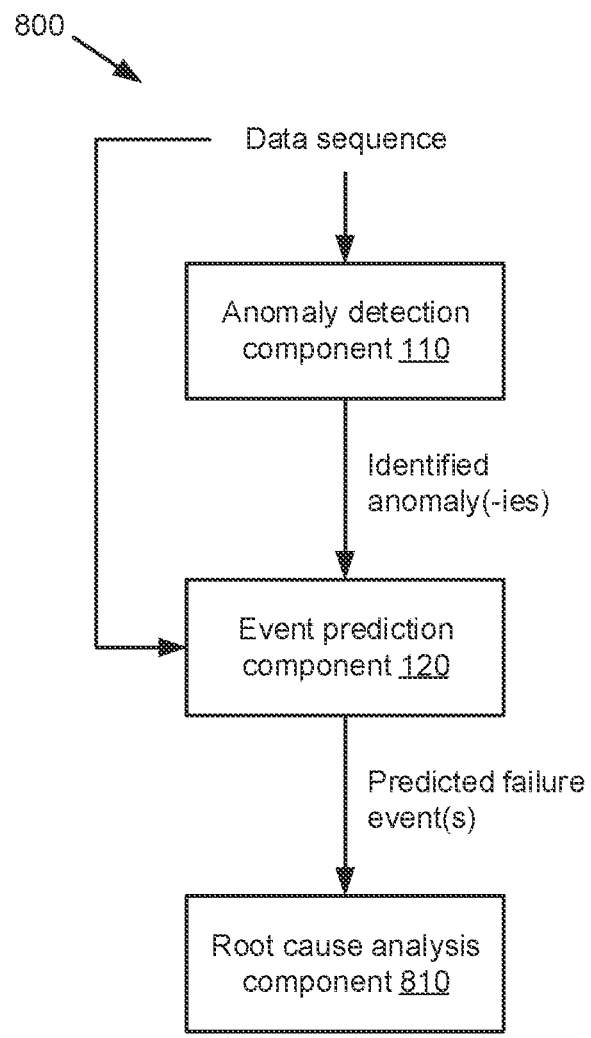

Referring next to FIG. 8, a block diagram of still another system 800 that facilitates time series anomaly detection with rare event failure prediction is illustrated. Repetitive description of like parts described above with regard to other implementations is omitted for brevity. System 800 as shown in FIG. 8 includes an anomaly detection component 110 and an event prediction component 120 that can operate as described with respect to one or more implementations provided above. System 800 further includes an RCA component 810 that, in response to the event prediction component 120 determining that a failure event is imminent (e.g., due to the likelihood of the event being at least a threshold probability), can determine a predicted cause of the failure event. In an implementation, the RCA component 810 can use a rule-based system, e.g., based on a group of logical rules, to suggest RCA based on the predictions provided by the event prediction component 120.

Figure 9:
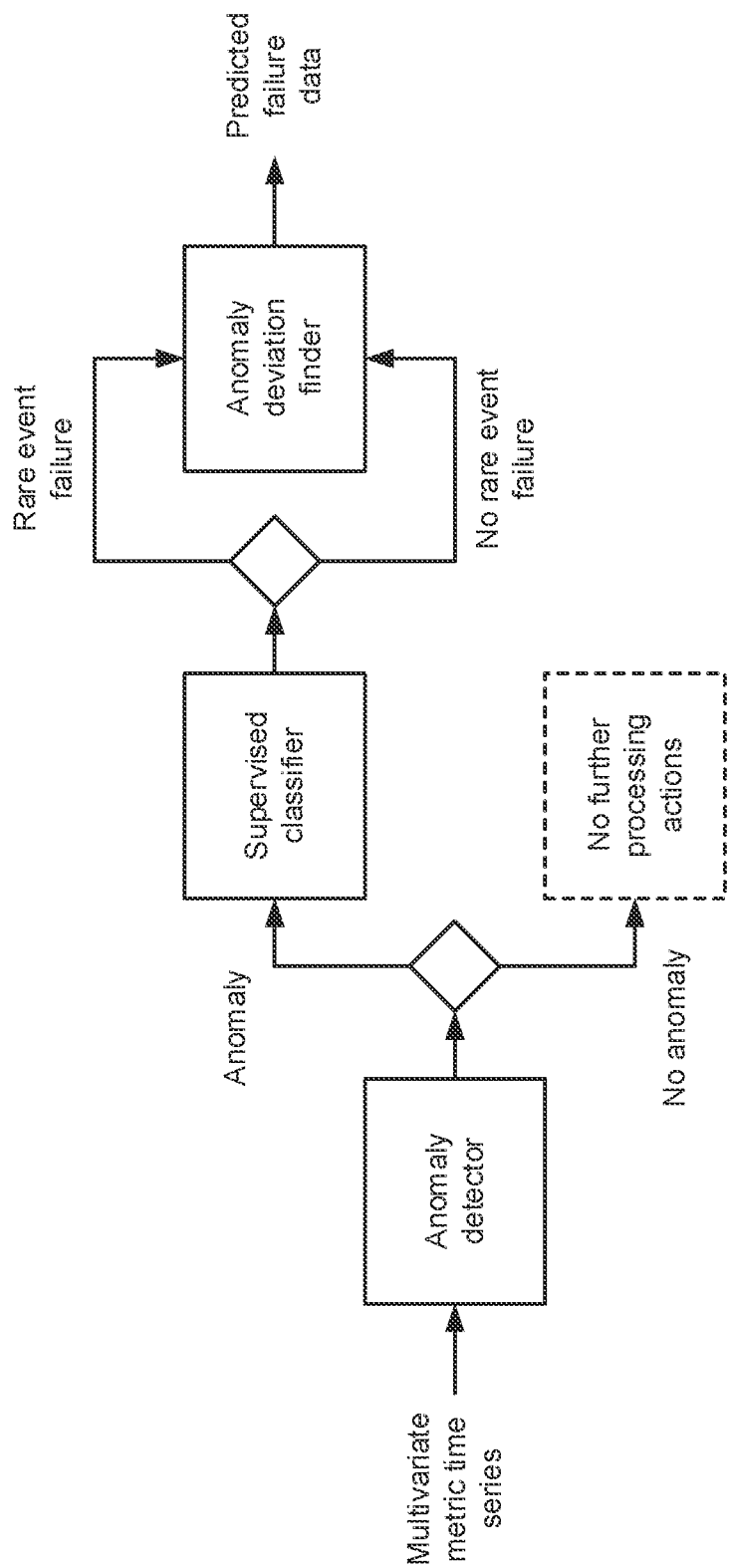
FIG. 9 is a diagram depicting example interactions between machine learning models and/or other system components that can be performed in various implementations described herein.

Moving to FIG. 9, a non-limiting example solution architecture that can be utilized in connection with various implementations described herein is illustrated. As shown in FIG. 9, multivariate metric time series data can initially be provided to an anomaly detector, which can utilize one or more unsupervised ML models to determine whether anomalies are present in the time series, e.g., in a similar manner to the operation of the anomaly detection component 110 described above.

If no anomalies are detected by the anomaly detector, no further processing actions are performed. Conversely, any detected anomalies are provided to a supervised classifier, which can analyze the detected anomalies and the original time series data using one or more supervised ML models, e.g., in a similar manner to the operation of the event prediction component 120 described above, to predict whether a rare event failure is imminent.

If a rare event failure is determined to be imminent by the supervised classifier, data relating to the failure can be provided to an anomaly deviation finder, which can perform RCA for the event in a similar manner to that described above with respect to FIG. 8. As further shown by FIG. 9, even if no rare event failure is determined by the supervised classifier to be imminent, the supervised classifier can still provide data relating to any analyzed anomalies to the anomaly deviation finder, e.g., for record keeping purposes, to enable later manual review of the data, and/or for other purposes.

Figure 10:
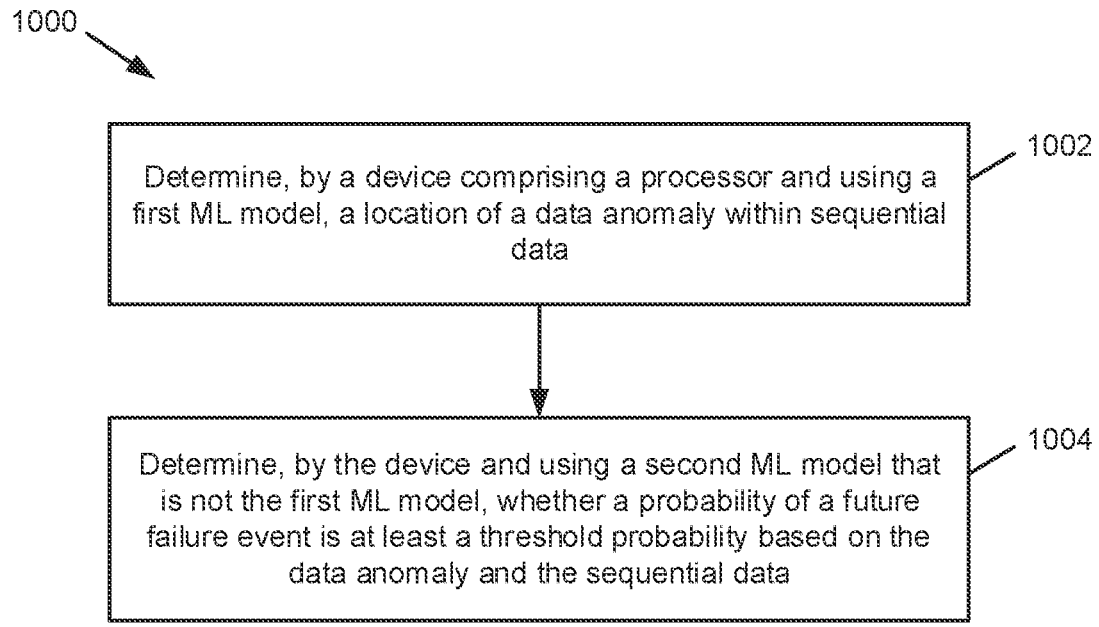
FIG. 10 is a flow diagram of a method that facilitates time series anomaly detection with rare event failure prediction in accordance with various implementations described herein.

Turning to FIG. 10, a flow diagram of a method 1000 that facilitates time series anomaly detection with rare event failure prediction is illustrated. At 1002, a device comprising a processor can determine (e.g., by an anomaly detection component 110), using a first ML model, a location of a data anomaly within sequential data.

At 1004, the device can determine (e.g., by an event prediction component 120), using a second ML model that is not the first ML model used at 1002, whether a probability of a future failure event is at least a threshold probability based on the data anomaly identified at 1002 and the sequential data.

Figure 11:
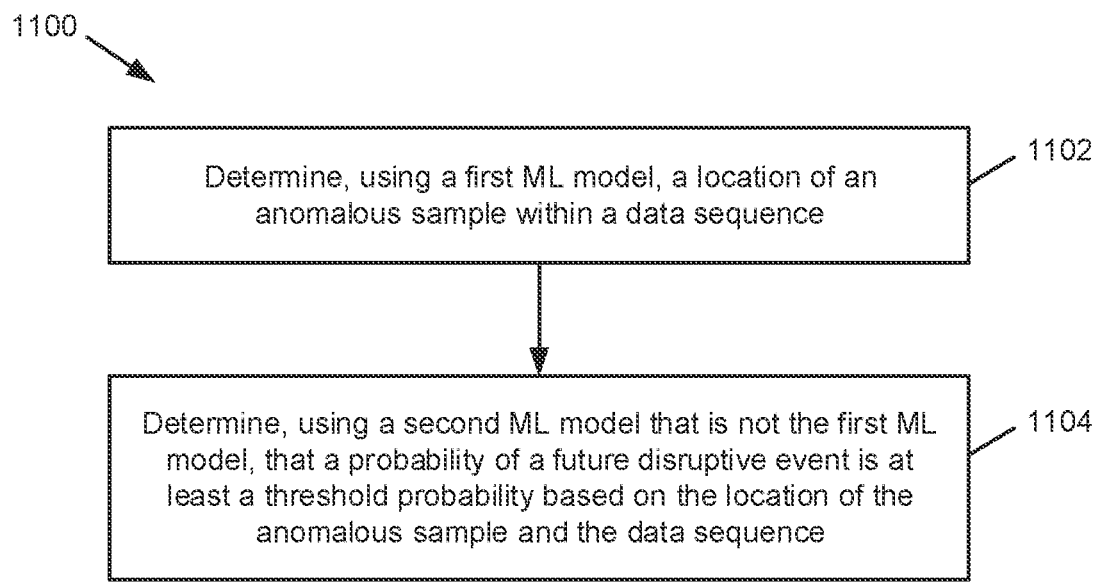
FIG. 11 is a flow diagram depicting respective operations facilitating time series anomaly detection with rare event failure prediction that can performed by a processor in accordance with various implementations described herein.

Referring next to FIG. 11, a flow diagram of a method 1100 that can be performed by a processor, e.g., based on machine-executable instructions stored on a non-transitory machine-readable medium, is illustrated. Example of computer architectures, including a processor and non-transitory media, that can be utilized to implement method 1100 are described below with respect to FIGS. 12-13.

Method 1100 can begin at 1102, in which the processor can determine, using a first ML model, a location of an anomalous sample within a data sequence.

At 1104, the processor can determine, using a second ML model that is not the first ML model, that a probability of a future disruptive event is at least a threshold probability based on the location of the anomalous sample and the sequential data.

FIGS. 10-11 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 12:
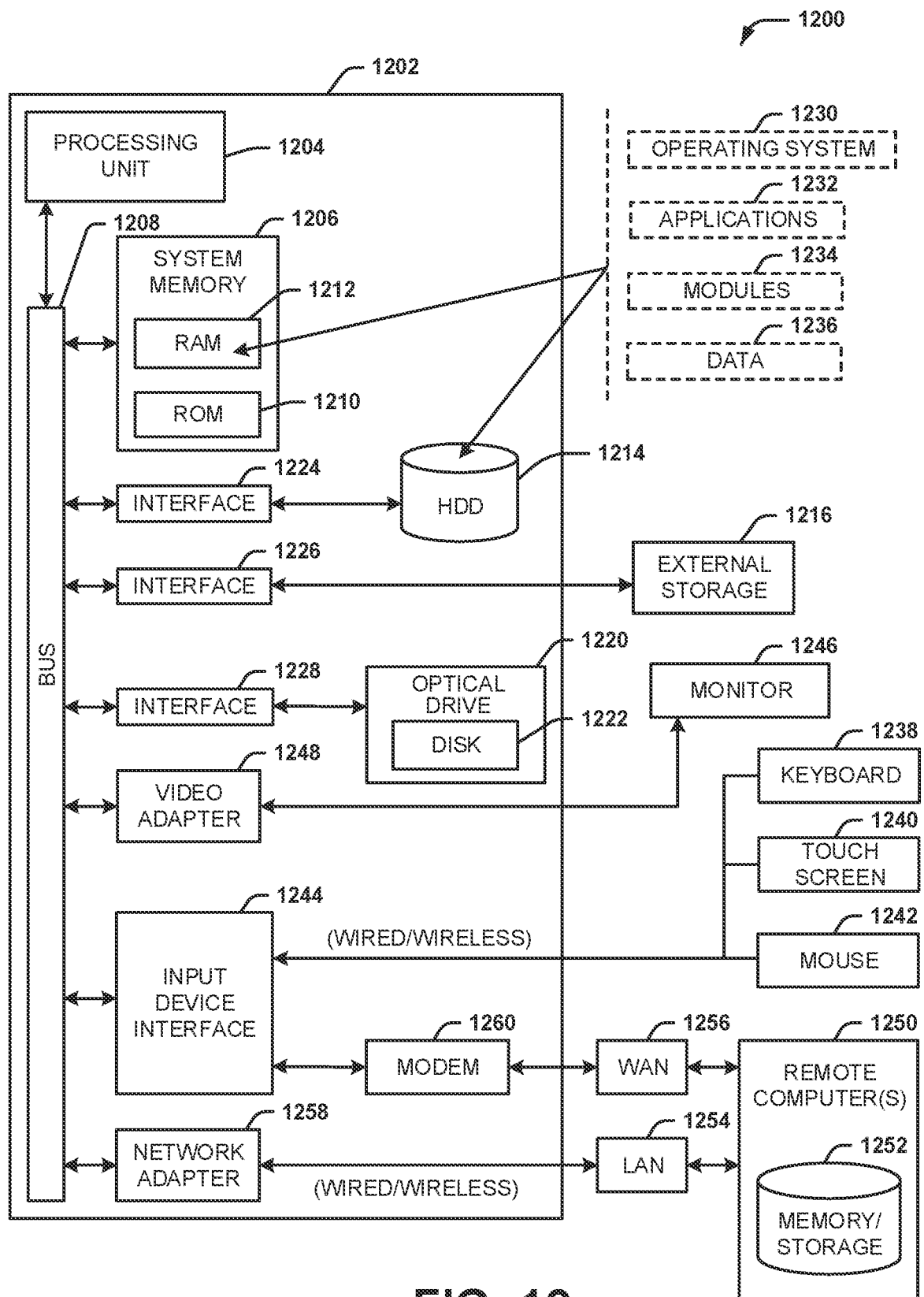
FIGS. 12-13 are diagrams of respective example computing environments in which various implementations described herein can function.
Figure 13:
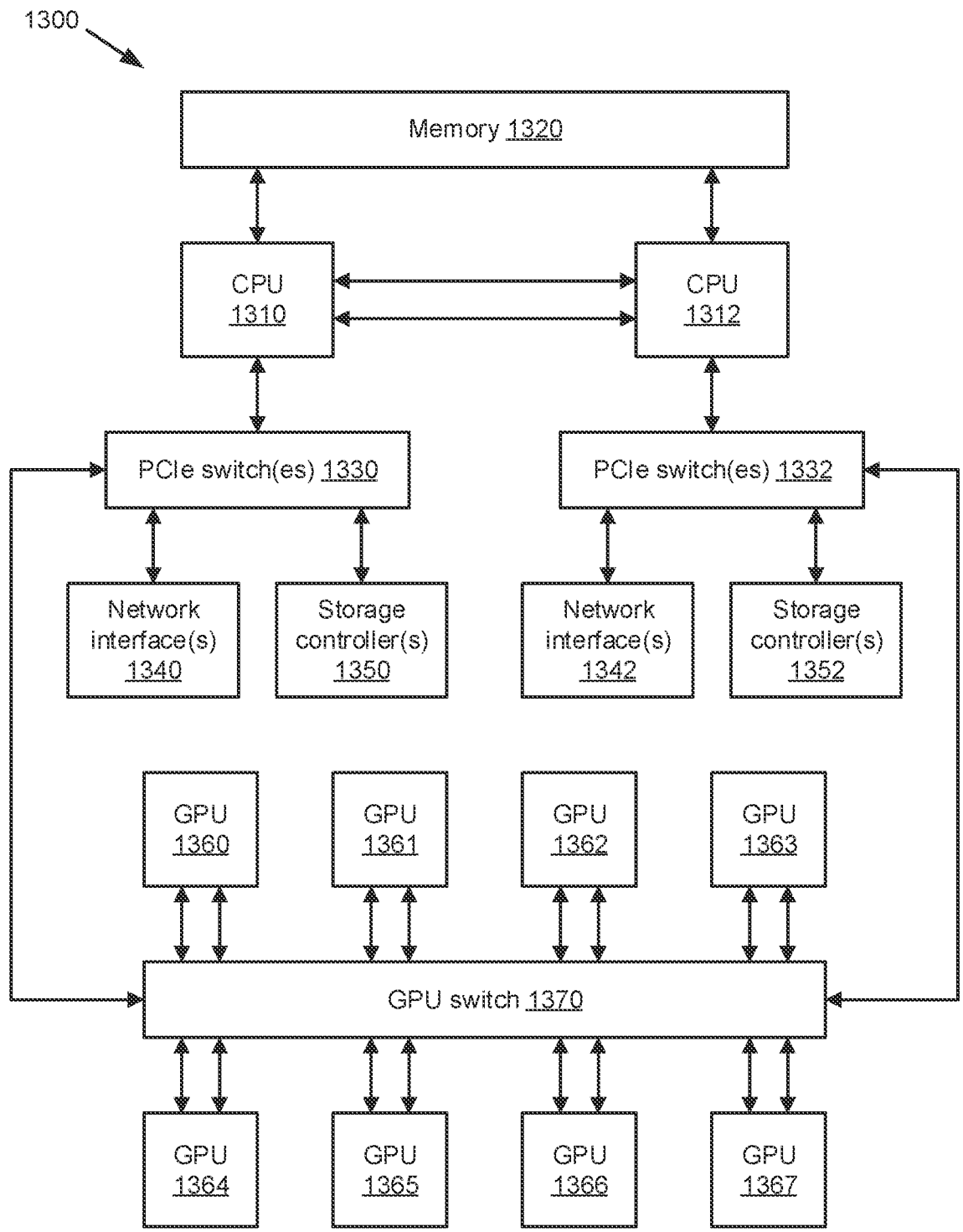

In order to provide additional context for various embodiments described herein, FIGS. 12-13 and the following discussion are intended to provide a brief, general description of suitable computing environments 1200, 1300 in which the various embodiments of the embodiment described herein can be implemented. More particularly, FIG. 12 illustrates a general-purpose computing environment 1200 that can be utilized to implement some of the computer-executable components described above, while FIG. 13 illustrates a server computing environment 1300 on which deep learning models and/or other ML models as described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 12, an example general-purpose environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning next to FIG. 13, an example server architecture 1300 that can be utilized in connection with one or more implementations described above is illustrated. The server architecture 1300 shown in FIG. 13 can be associated with a server device, such as a rackmount server, a blade server, or the like, which can be physically and/or communicatively coupled to a chassis (not shown in FIG. 13) and/or other physical devices for use in a computing environment such as a computing cloud, a data center, etc.

The server architecture 1300 shown in FIG. 13, referred to below as simply a server for brevity, can include one or more central processing units (CPUs), here two CPUs 1310, 1312. In a typical implementation of the server 1300, the CPUs 1310, 1312 are high-performance server processors that provide scalability and a high number of processing cores per CPU, e.g., up to 56 cores per processor for current implementations. The CPUs 1310, 1312 of the server 1300 are communicatively coupled to each other by, e.g., processor interconnect links, such as QuickPath Interconnect (QPI) or Ultra Path Interconnect (UPI) links developed by the Intel® Corporation. Alternatively, other means for coupling the CPUs 1310, 1312, such as a front side bus (FSB) or the like, could also be used. While two interconnect links are shown in FIG. 13 coupling CPUs 1310 and 1312, it is noted that more, or fewer, links could also be used.

The CPUs 1310, 1312 shown in FIG. 13 are additionally coupled to a system memory 1320, which can include one or more Dual In-line Memory Modules (DIMMs) and/or other devices. While the system memory 1320 is illustrated as a single block in FIG. 13 for simplicity, it is noted that the system memory 1320 is typically implemented via a group of memory modules. For example, the CPUs 1310, 1312 can collectively be associated with a number of DIMM slots (e.g., 16 slots, 32 slots, etc.), and DIMMs making up the system memory 1320 can be placed into these slots to facilitate connection to the CPUs 1310, 1312. Depending on implementation, the memory modules making up the system memory 1320 can be communicatively coupled to one, or more, of the CPUs 1310, 1312.

As further shown in FIG. 13, Peripheral Component Interconnect Express (PCIe) switches 1330, 1332 can connect the CPUs 1310, 1312 to respective other components of the server 1300, such as network interfaces 1340, 1342, storage controllers 1350, 1352, or the like. The network interfaces 1340, 1342 can include network interface cards (NICs) and/or other suitable components to facilitate connecting the server 1300 to other servers or suitable computing devices, e.g., in a clustered computing environment. The storage controllers 1350, 1352 can include nonvolatile memory express (NVMe) controllers and/or other interface devices that facilitate the coupling of storage devices, such as non-volatile RAM (NVRAM) devices, SSDs, or the like, to the server 1300.

While FIG. 13 shows a configuration in which each CPU 1310, 1312 is connected to one PCIe switch 1330, 1332, other configurations could be used. For instance, a one-to-many or many-to-one connection scheme could be used between the CPUs 1310, 1312 and the PCIe switches 1330, 1332. Similarly, the network interfaces 1340, 1342 and storage controllers 1350, 1352 could be connected to the PCIe switches 1330, 1332 in a one-to-many or many-to-one configuration in addition to, or in place of, the one-to-one connection scheme shown in FIG. 13.

The server 1300 shown in FIG. 13 further includes a group of co-processors, such as graphics processing units (GPUs), intelligence processing units (IPUs) for artificial intelligence workloads or the like. In FIG. 13, there are eight GPUs 1360-1367, which provide further processing capability to server 1300. While eight GPUs 1360-1367 are shown in FIG. 13, more, or fewer, GPUs could also be used. The GPUs 1360-1367 of server 1300 are preferably specialized GPUs that are designed for high-performance computing applications, such as H100 and/or A100 GPUs developed by the NVIDIA® Corporation, although other GPUs, IPUs, etc., could also be used. Each of the GPUs 1360-1367 of the server are communicatively coupled to each other via suitable communications links, such as NVLink® interconnects developed by the NVIDIA® Corporation and/or other suitable connections. In the example shown by FIG. 13, a GPU 1370 facilitates full interconnection between the GPUs 1360-1367. In other implementations, the GPUs 1360-1367 could instead be interconnected directly without the use of a switch or other means.

As additionally shown by FIG. 13, the GPU 1370 is communicatively coupled to the PCIe switches 1330, 1332 to enable communication between the GPUs 1360-1367 and other components of the server 1300. Other connection schemes could also be used. For instance, one or more of the GPUs 1360-1367 could connect to the PCIe switches 1330, 1332 and/or the CPUs 1310, 1312 directly, e.g., in an implementation in which a GPU 1370 is not present. In this architecture, deep learning models would be executed in the GPUs 1360-1367 rather than the CPUs 1310, 1312.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one memory that stores executable components; and
   at least one processor that executes the executable components stored in the at least one memory, wherein the executable components comprise:
      an anomaly detection component that locates, using a group of unsupervised machine learning models, anomalous data points within a data sequence via a voting procedure, the voting procedure comprising applying importance scores to respective ones of the group of unsupervised machine learning models based on a criterion selected from a group of criteria comprising accuracy of the respective ones of the group of unsupervised machine learning models and F1 scores of the respective ones of the group of unsupervised machine learning models, weighting model outputs of the respective ones of the group of unsupervised machine learning models based on the importance scores, resulting in weighted model outputs, and generating an aggregated model output from the weighted model outputs, wherein the data sequence comprises a multivariate data stream of telemetry data collected from a computing system; and
      an event prediction component that executes a supervised machine learning model in response to the anomaly detection component locating an anomalous data point of the anomalous data points and determines whether a likelihood of a future service disruption event, corresponding to an imminent failure of a device of the computing system, is at least a threshold likelihood based on an output of the supervised machine learning model as applied to the anomalous data point and the data sequence, wherein the supervised machine learning model does not perform any processing operations on the data sequence in response to the anomaly detection component not locating the anomalous data point.

2. The system of claim 1, wherein the telemetry data is indicative of system metrics of the device of the computing system, the device being selected from a group of devices comprising a computing system device and a data storage device.

3. The system of claim 2, wherein the supervised machine learning model is trained using labeled training data corresponding to respective samples of the system metrics preceding previous service disruption events caused by previous failures of devices of the computing system.

4. The system of claim 2, wherein the system metrics are of a type selected from a group of metric types comprising performance metrics and capacity metrics.

5. The system of claim 1, wherein the event prediction component processes the data sequence using a group of supervised machine learning models, comprising the supervised machine learning model, resulting in respective model outputs, and selects the supervised machine learning model from the group of supervised machine learning models based on the model outputs and a selection criterion.

6. The system of claim 1, wherein:
   the supervised machine learning model is a first supervised machine learning model,
   the future service disruption event is a first future service disruption event,
   the likelihood of the first future service disruption event is a first likelihood,
   the threshold likelihood is a first threshold likelihood,
   the event prediction component further determines, using a second supervised machine learning model that is not the first supervised machine learning model, whether a second likelihood of a second future service disruption event is at least a second threshold likelihood based on the anomalous data point and the data sequence, and
   the first future service disruption event is of a first event type that is not a second event type of the second future service disruption event.

7. The system of claim 1, wherein the executable components further comprise:
   a root cause analysis component that, in response to the event prediction component determining that the likelihood of the future service disruption event is at least the threshold likelihood, determines a predicted cause of the future service disruption event using logical rules.

8. A method, comprising:
   determining, by a system comprising at least one processor and using a group of unsupervised machine learning models, a location of a data anomaly within sequential data based on a voting procedure, the voting procedure comprising applying importance scores to respective ones of the group of unsupervised machine learning models based on a criterion selected from a group of criteria comprising accuracy of the respective ones of the group of unsupervised machine learning models and F1 scores of the respective ones of the group of unsupervised machine learning models, weighting model outputs of the respective ones of the group of unsupervised machine learning models based on the importance scores, resulting in weighted model outputs, and generating an aggregated model output from the weighted model outputs, wherein the sequential data comprises a multivariate data stream of telemetry data collected from a computing system;

running, by the system, a supervised machine learning model in response to the unsupervised machine learning model detecting the data anomaly, wherein the system does not perform any processing operations on any data of the multivariate stream of telemetry data via the supervised machine learning model absent the unsupervised machine learning model detecting the data anomaly; and determining, by the system, whether a probability of a future failure event, corresponding to an imminent failure of a device of the computing system, is at least a threshold probability based on an output of the supervised machine learning model as applied to the data anomaly and the sequential data.

9. The method of claim 8, wherein the telemetry data is indicative of metrics associated with the device of the computing system, the device being selected from a group of devices comprising a data storage device and a computing system device.

10. The method of claim 9, wherein the supervised machine learning model is trained using training data corresponding to respective samples of the metrics in respective time intervals preceding past system failure events caused by previous failures of devices of the computing system.

11. The method of claim 9, wherein the metrics are of a type selected from a group of metric types comprising performance metrics and capacity metrics.

12. The method of claim 8, wherein the supervised machine learning model is a first supervised machine learning model, wherein the future failure event is a first future failure event, wherein the probability of the first future failure event is a first probability, wherein the threshold probability is a first threshold probability, and wherein the method further comprises:

determining, by the system and using a second supervised machine learning model that is not the first supervised machine learning model, whether a second probability of a second future failure event is at least a second threshold probability based on the data anomaly and the sequential data, the first future failure event being of a different event type than the second future failure event.

13. A non-transitory machine-readable medium comprising computer executable instructions that, when executed by at least one processor, facilitate performance of operations, the operations comprising:

determining, using a group of unsupervised machine learning models, a location of an anomalous sample within a data sequence comprising a multivariate data stream of telemetry data collected from a computing system via a voting procedure, the voting procedure comprising applying importance scores to respective ones of the group of unsupervised machine learning models based on a criterion selected from a group of criteria comprising accuracy of the respective ones of the group of unsupervised machine learning models and F1 scores of the respective ones of the group of unsupervised machine learning models, weighting model outputs of the respective ones of the group of unsupervised machine learning models based on the importance scores, resulting in weighted model outputs, and generating an aggregated model output from the weighted model outputs;

executing a supervised machine learning model in response to the unsupervised machine learning model detecting the anomalous sample, wherein the supervised machine learning model does not perform any processing actions on the multivariate data stream of telemetry data where the unsupervised machine learning model does not detect the anomalous sample; and determining that a probability of a future disruptive event, corresponding to an imminent failure of a device of the computing system, is at least a threshold probability based on an output of the supervised machine learning model as applied to the location of the anomalous sample and the data sequence.

14. The non-transitory machine-readable medium of claim 13, wherein the telemetry data is indicative of metrics of the device of the computing system, the device being selected from a group of devices comprising a computing system device and a data storage device, and wherein the metrics are selected from a group comprising performance metrics and capacity metrics.

15. The non-transitory machine-readable medium of claim 13, wherein the operations further comprise:

in response to the determining that the probability of the future disruptive event is at least the threshold probability, predicting a root cause of the future disruptive event based on a group of logical rules.

16. The system of claim 3, wherein generation of the labeled training data comprises:

defining a sample of the respective samples of the system metrics with respect to a moving sample window;

in response to a previous service disruption event, of the previous service disruption events, being determined to have occurred within a label window immediately following the moving sample window corresponding to the sample, adding the sample to the labeled training data.

17. The system of claim 5, wherein the group of supervised machine learning models comprises a specialized supervised machine model, trained on a first number of parameters associated with a defined device failure type, and a general supervised machine learning model, trained on a second number of parameters that is larger than the first number of parameters.

18. The method of claim 8, wherein the running of the supervised machine learning model comprises running a group of supervised machine learning models, comprising the supervised machine learning model, resulting in respective supervised model outputs, and selecting the supervised machine learning model from the group of supervised machine learning models based on the respective supervised model outputs and a selection criterion.

19. The method of claim 18, wherein the group of supervised machine learning models comprises a specialized supervised machine model, trained on a first number of parameters associated with a defined device failure type, and a general supervised machine learning model, trained on a second number of parameters that is larger than the first number of parameters.

20. The system of claim 16, wherein the previous service disruption event is a first previous service disruption event, and wherein the generation of the labeled training data further comprises:
   in response to a second previous service disruption event, of the previous service disruption events, being determined to have occurred within the moving sample window corresponding to the sample and not within the label window, omitting the sample from the labeled training data.

\* \* \* \* \*